F. G. WALKER.
UNIVERSAL JOINT.
APPLICATION FILED NOV. 4, 1915.
1,181,625.
Patented May 2, 1916.
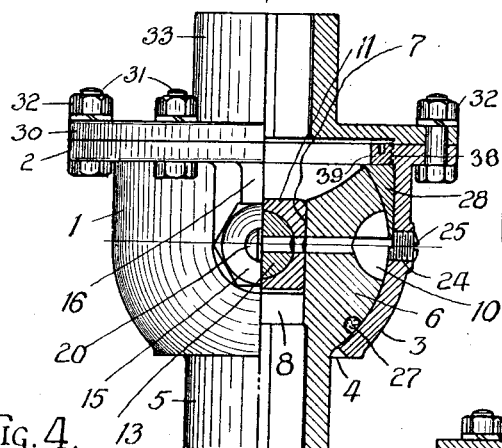
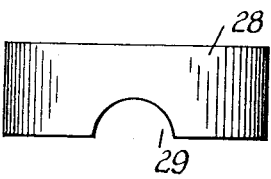
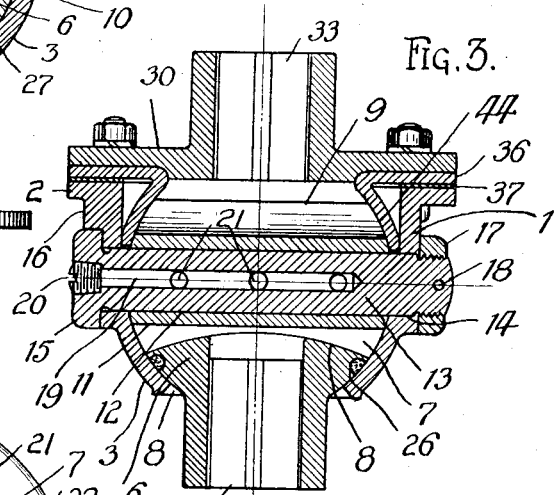
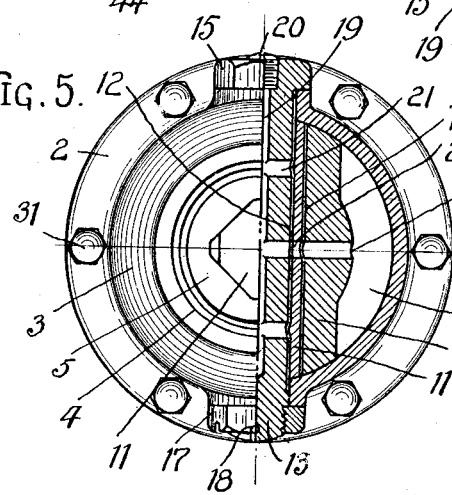
WITNESSES:
Karl H. Butler
Chas W. Stauffiger
INVENTOR
FREDERICK G. WALKER.
BY
ATTORNEYS

UNITED STATES PATENT OFFICE.

FREDERICK G. WALKER, OF DETROIT, MICHIGAN.

UNIVERSAL JOINT.

1,181,625.  Specification of Letters Patent.  Patented May 2, 1916.

Application filed November 4, 1915. Serial No. 59,519.

*To all whom it may concern:*

Be it known that I, FREDERICK G. WALKER, a citizen of the United States of America, residing at Detroit, in the county of Wayne and State of Michigan, have invented certain new and useful Improvements in Universal Joints, of which the following is a specification, reference being had therein to the accompanying drawings.

Figure 1 is a plan of a universal joint, partly in section; Fig. 2 is a plan of a detached bearing member thereof; Fig. 3 is a horizontal sectional view of the universal joint, illustrating a modified form of bearing member; Fig. 4 is a plan of a detached modified form of bearing member; Fig. 5 is an end view of the universal joint, partly in section; Fig. 6 is a plan of a detached ball member; and Fig. 7 is a detail view of rollers constituting a trunnion block.

The drawing shows structural elements which are capable of withstanding severe stresses and strains, such as encountered by a universal joint used in connection with an automobile or similar vehicle, and particular attention has been directed to the simplicity of construction by which the parts are inexpensive to manufacture, easy to assemble and insure a positive transmission of power from a drive member to a driven member. To reduce friction to an unappreciable degree, provision has been made for a thorough lubrication of the movable parts of the joint.

In describing my invention by aid of the views above referred to, I desire to point out that the same are merely intended as illustrative of an example whereby my invention may be applied in practice, and I do not care to confine my invention to the precise construction and arrangement of parts shown. The following description is therefore to be broadly construed as including substitute constructions and arrangements of parts which are the obvious equivalents of those to be hereinafter referred to.

The reference numeral 1 denotes a cylindrical socket member having one end thereof provided with a peripheral flange 2 and the opposite end thereof terminating in a frusto-conical seat 3 which has an axial opening 4 providing clearance for the socket 5 of a ball member 6. The ball member 6 is free to shift upon the seat 3 and said ball member has a transverse slot presenting confronting flat walls 7 and a convex bottom wall 8. The inner end of the ball member is cut away, as at 9, to reduce the weight of said member, and a side wall of said member has a lubricant pocket 10, the purpose of which will hereinafter appear.

In the slot of the ball member is a trunnion block 11 rectangular in cross section whereby facets thereof will engage and ride against the flat confronting walls 7 of the block slot. The trunnion block 11 has a cylindrical longitudinal bore 12 to receive a bolt 13 extending through alining openings 14 provided therefor in the socket member 1. One end of the bolt 13 has a head 15 and a facet of said head engages a boss or enlargement 16 on the socket member 1 to prevent the bolt from rotating relative to said socket member. The opposite end of the bolt is screwthreaded to receive a castellated nut 17 screwed upon the bolt and locked thereon by a cotter pin 18 or other fastening means. The headed end of the bolt 13 has a longitudinal channel 19 and the open end of this channel is normally closed by a detachable screw plug 20. The channel 19 is in communication with a series of radial ports 21 communicating with a longitudinal feed groove in the periphery of said bolt and when the channel is filled with oil or a suitable lubricant, the ports 21 supply the confronting surfaces of the bolt 13 and the trunnion block 11 with a lubricant. The trunnion block 11 has a longitudinal feed groove and a single port 22 communicating with a port 23 in the ball member 6 and this last mentioned port establishes communication between the lubricant pocket 10 and the channel 19, whereby lubricant from the channel may enter the pocket 10 and thoroughly lubricate the seat 3 and other wearing surfaces of the socket member 1 or the ball member 6.

In some instances, the socket member 1 may be provided with an opening 24 permitting of a lubricant being placed in the pocket 10, independently of the channel 19, and the opening 24 may be normally closed by a screw plug 25 or a suitable closure.

To confine lubricant upon the seat of the socket member 1 and prevent escape through the opening 4, the ball member 6 has an annular groove 26 in which is placed a packing ring 27 engaging the seat 3 and precluding any possibility of lubricant waste.

The trunnion block 11 corresponds in length to the slot of the ball member and said block has the ends thereof rounded to conform to the periphery of said ball member, thereby providing clearance for the inner end of a bearing member 28 seated upon the inner end of the ball member within the socket member 1. The bearing member 28 is best shown in Fig. 2 in its preferred form, said bearing member having diametrically opposed walls thereof cut away or recessed, as at 29, to provide clearance for the bolt 13. The bearing member 28 is retained within the socket member 1 by an adjustable retaining ring 39 held by screw threads of the socket member 1. The ring may be placed in position and adjusted by a spanner wrench and said ring is adapted to engage and seat upon the bearing member 28. As the bearing member wears the retaining ring can be adjusted to compensate for such wear thus obviating the necessity for using shims or liners. The retaining ring prevents displacement of the bearing and ball members relative to the socket member, and constitutes means within the socket member whereby the bearing member may be adjusted. A cap 30 is secured to the peripheral flange 2 of the socket member 1 by bolts 31, and nuts 32 or other fastening means, and said cap 30 has a socket 33 adapted to receive a shaft.

A modified form of bearing member designated 44 in Figs. 3 and 4, has an annular flange 36 extending between the cap 30 and the peripheral flange 2 of the socket member 1, to be held in place by the same fastening means as the cap 30. Shims or liners 37 are interposed between the flange 36 and the flange 2 and should the bearing member wear and need adjustment then one of the shims or liners is removed. Should the preferred form of bearing member, as shown in Figs. 1 and 2, show signs of wear and need of adjustment, then additional shims or liners are placed in position to maintain the bearing member constantly in engagement with the ball member 6. In either instance, the bearing member represents a continuation of the concave seat 3 of the socket member 1, thus insuring a surface upon which the ball member may shift and still maintain rotative continuity between the sockets 5 and 33 and drive and driven members connected thereto.

The design of the socket member 1 is such that it can be readily made and the ball member easily placed therein; the trunnion block 11 placed in the slot of said ball member; the bolt 13 placed in the trunnion block and fixed relative to the socket member; the bearing member placed in the socket member upon the ball member, and then the cap placed in position and connected to the socket member whereby the various parts of the universal joint cannot become accidentally displaced. The method of assembling is a bench proposition and before the universal joint is placed in use a lubricant can be placed in the pocket 10 or the channel 19 to insure a non-frictional coöperation of the movable part of the joint. The joint is dust proof for all practical purposes and while it has been mentioned as being applicable for power transmission in connection with an automobile, it is apparent that the universal joint may be used in connection with shafting or instrumentalities adapted for angular relation and transmission of power.

A further modification is illustrated in Fig. 8 of the drawing, showing rollers as a substitute for the square or rectangular trunnion block 11. The rollers are designated 42 and are free to revolve upon the bolt 13, said rollers having conical confronting ends 43 designed to reduce friction between the rollers, when one roller revolves in an opposite direction to that of the other. Considering this modification as applied to the structure shown in Fig. 3, it is apparent that when the socket 5 is shifted to the right, one of the rollers would revolve clockwise and the other roller counter-clockwise and vice versa when the socket 5 is shifted to the left. The use of such rollers in the slot of the ball member provides a line contact with the walls of the slot in contradistinction to the wide flat facets of the trunnion block 11, consequently there is material reduction in their friction and expense of manufacture without sacrificing strength or the purpose of the trunnion member within the slot of the ball member. The adjustability of the different bearing members herein referred to form an important feature of my invention, as the longevity of the universal joint is materially increased and it is only necessary to make such adjustment when any lost motion is discovered in the joint.

What I claim is:—

1. A universal joint comprising a socket member, a ball member therein, a bearing member in said socket member adapted to retain said ball member in engagement therewith, and a retaining ring seated on said bearing member and connected to said socket member.

2. A universal joint comprising a socket member having a seat, a ball member on the seat of said socket member, a bearing member on said ball member, means carried by said socket member and extending through said ball member having a rolling contact with said ball member and adapted to cause rotative continuity between said socket and ball members, a cap on said socket member to retain said bearing member therein, and adjustable means engaging said socket member independent of said cap to hold said bearing member on said ball member.

3. In a universal joint having a socket member and a ball member, an adjustable bearing member engaging said ball member, and means screwed against said bearing member, whereby said bearing member may be adjusted relative to said socket member.

In testimony whereof I affix my signature in presence of two witnesses.

FREDERICK G. WALKER.

Witnesses:
ANNA M. DORR,
KARL H. BUTLER.

Copies of this patent may be obtained for five cents each, by addressing the "Commissioner of Patents, Washington, D. C."